Oct. 4, 1949.  F. M. ROBINSON ET AL  2,483,673
BATTERY CHARGER

Filed Oct. 2, 1946  3 Sheets-Sheet 1

INVENTORS
FRANK M. ROBINSON
BY CARSTEN D. STEIN

Kwis, Hudson, Boughton & Williams
ATTORNEYS

Oct. 4, 1949. F. M. ROBINSON ET AL 2,483,673
BATTERY CHARGER
Filed Oct. 2, 1946 3 Sheets-Sheet 2

INVENTORS
FRANK M. ROBINSON
BY CARSTEN D. STEIN

Kwis, Hudson, Boughton & Williams
ATTORNEYS

Oct. 4, 1949.  F. M. ROBINSON ET AL  2,483,673
BATTERY CHARGER

Filed Oct. 2, 1946  3 Sheets-Sheet 3

INVENTORS
FRANK M. ROBINSON
BY CARSTEN D. STEIN

Kwis, Hudson, Boughton & Williams
ATTORNEYS

Patented Oct. 4, 1949

2,483,673

UNITED STATES PATENT OFFICE 2,483,673

BATTERY CHARGER

Frank M. Robinson and Carsten D. Stein, Minneapolis, Minn., assignors to Jordan Electrical Manufacturing Company, Minneapolis, Minn., a corporation of Minnesota Application October 2, 1946, Serial No. 700,620

6 Claims. (Cl. 320—48)

This invention relates to an improved storage battery charging unit, and more particularly to a trickle charger adapted to maintain batteries at full charge.

It has been found that lead storage batteries, of the type employed in automobiles, trucks or the like, lose their charge at the rate of approximately one point of gravity a day while in storage; therefore, if the batteries are allowed to stand for long periods of time without renewing the charge, sulphation occurs with resulting hardening and possible cracking of the plates and other undesirable consequences. This sulphation cannot be satisfactorily corrected by subsequent charging and, hence, if the condition is allowed to occur, the capacity of the battery is permanently reduced resulting in poor performance and short life when the battery is finally placed in service.

In order to prevent these difficulties, the charge on stored batteries should be frequently renewed or the batteries continuously charged at a very low rate. It is not, however, economical to employ the usual battery charging equipment of a garage, or a storage battery sales and service agency, for this purpose since such a use interferes with employment of the equipment for revenue producing charging of customer's batteries. Moreover, the usual charging equipment is not generally located adjacent the display racks for the new batteries so that considerable time and labor must be expended in transporting the new batteries from display to the charging equipment and back to display again. Consequently, the proper maintenance of the charge on new batteries is frequently neglected.

One of the principal objects of the invention, therefore, is to provide an improved trickle charger for storage batteries, in combination with a storage battery display stand or rack, for maintaining the displayed batteries at full charge without the necessity of removing the latter from display.

Another object of the invention is to provide a combined storage battery display stand or rack and charging unit such that the batteries may be maintained at full charge while displayed and the charging condition thereof visibly indicated to a prospective purchaser.

A further object of the invention is to provide an improved storage battery trickle charging unit, having connections for simultaneously charging a plurality of batteries, with separate electrical lamps for indicating the charging condition of each battery connected thereto, the lamps being mounted on a side wall of the housing for the unit.

An additional object of the invention is to provide a storage battery charging unit, having separate conductors for connection to a plurality of batteries, with improved battery terminal engaging members whereby the members cannot be reversely applied to a battery, and the charging unit cannot be short-circuited by accidental engagement of the terminal engaging members when disconnected from a battery.

A still further object of the invention is to provide an improved storage battery charging unit comprising a transformer and rectifier enclosed in a unitary housing and having a plurality of pairs of conductors for connecting the output of the unit to one or more storage batteries, the unit further comprising a separate electrical lamp for each pair of conductors mounted on a side wall of the housing and each connected in series with one conductor of the pairs of conductors, the negative terminal engaging member at the end of one conductor of each pair of conductors being so constructed and arranged as to prevent short-circuiting of the unit and improper connections of the unit to the batteries.

Other objects and advantages of the invention reside in various constructions and arrangements of parts as will become more apparent from the following detailed description of a preferred embodiment of the invention which is illustrated in the accompanying drawings in which.

Figure 1:
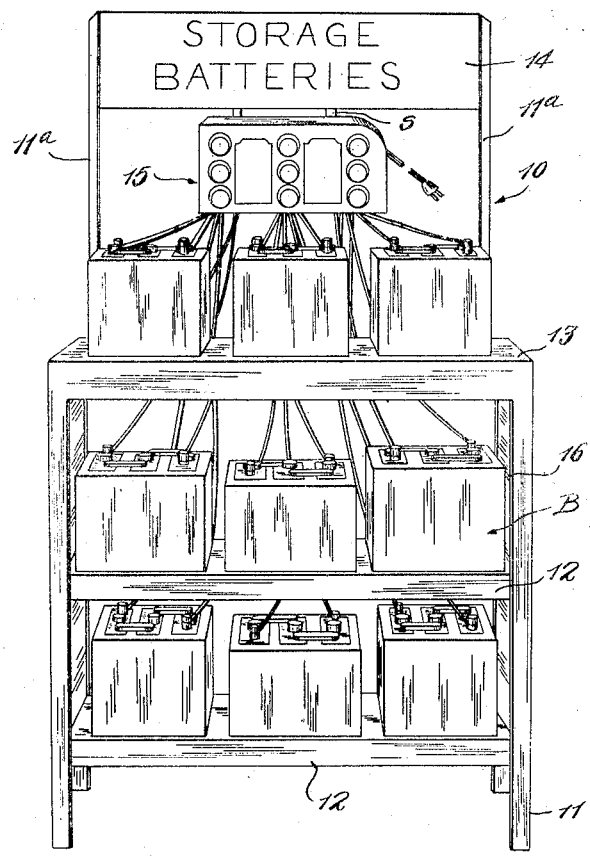
Fig. 1 is a perspective view of a combined storage battery display stand or rack and charging unit embodying the invention.

In Fig. 1 of the drawings there is illustrated a combined storage battery display stand or rack and charging unit, generally designated 10, for supporting storage batteries in an attractive display and simultaneously maintaining the batteries at full charge. The display stand or rack may take a variety of forms, but in the preferred embodiment comprises four vertical posts or legs 11 interconnected by spaced horizontally extending shelves 12, the upper ends of the legs 11 being connected with a horizontally extending shelf or top 13. Extending vertically upward from the rear edge of the top 13 are spaced posts 11a, the tops of which are united by a horizontally extending display panel 14 to which the improved battery charging unit 15 may be attached by conventional means, such as straps s.

The display stand or rack may be constructed from either wood or metal, and if the latter be employed, may comprise suitably bent sheet metal members for forming the shelves 12, top 13, display panel 14, and side panels 16 of which the legs 11 form an integral part. The display stand may also be constructed by employing angle iron members for the legs 11, the cross members 12 and the posts 11a, the batteries B then being supported upon the inturned flanges of the cross members 12, which constitute skeleton shelves, the front and rear angle members being united by cross braces if desired.

Figure 2:
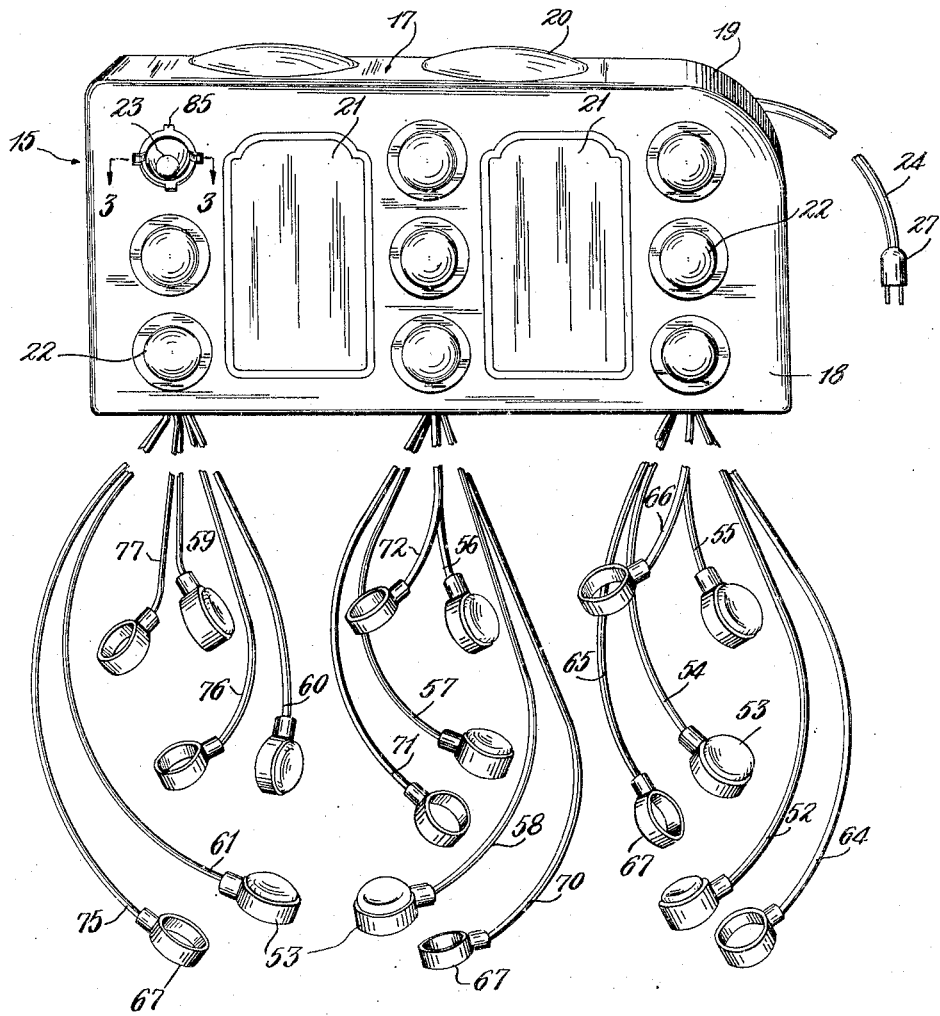
Fig. 2 is a perspective view of the novel charging unit per se, showing the improved battery terminal engaging members, one of the caps for the lamps of the unit being removed.
Figure 5:
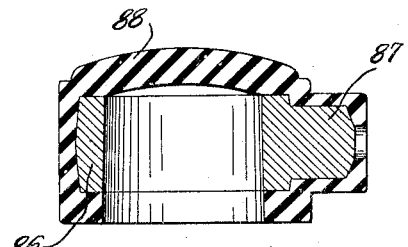
Fig. 5 is a sectional view substantially through the center of one of the negative battery terminal engaging members.

As will be seen from Figs. 1 and 2, the improved battery charging unit 15, which is a full wave trickle charger, comprises an attractive unitary housing or case 17, the side walls of which include a front panel or face 18 and side and top panels 19. The top 19 may be provided with one or more louvers 20 to provide ventilation for the interior of the casing 17 and conduct away the heat generated by the rectifier and transformer therein. The front panel or face 18 of the charging unit is preferably provided with one or more areas 21, upon which may be placed advertising matter and/or instructions for use of the apparatus. Arranged in vertical columns adjacent the sides of the front face or panel 18 and intermediate the areas 21 are a plurality of forwardly projecting, removable lamp caps 22, which are preferably formed of colored translucent glass or plastic, and cover individual electric indicating and ballast lamps 23 mounted in brackets attached to the inner face of the front 18 in a manner hereinafter described.

The illustrated embodiment of the charging unit is designed for use with a maximum of nine storage batteries, although the unit may be designed for handling a greater or lesser maximum number of batteries. As will hereinafter become apparent, any lesser number of batteries than the maximum for which the unit is designed may be charged without altering the device or without danger of a short circuit resulting from the engagement of the non-connected terminals.

Figure 6:
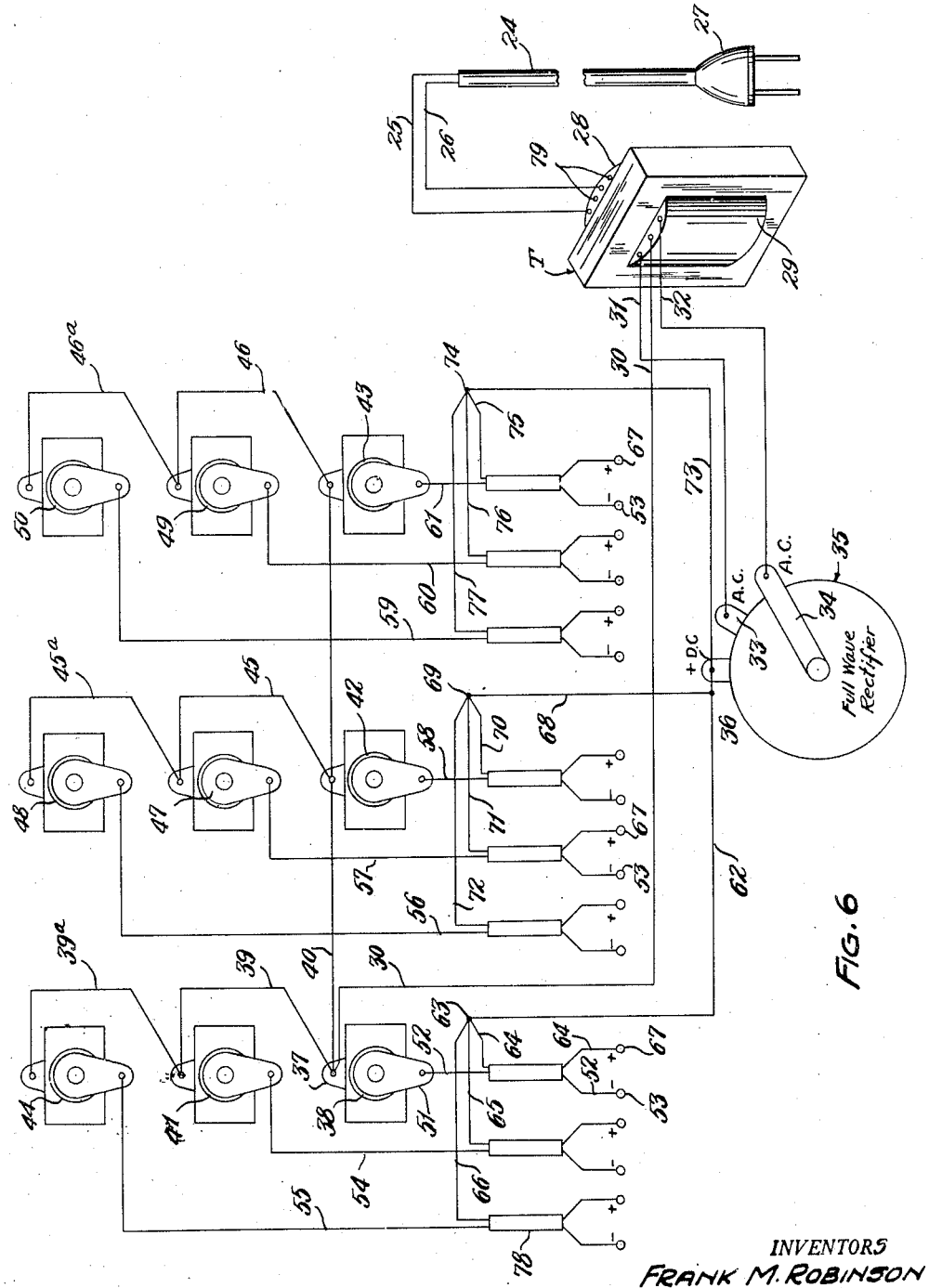
Fig. 6 is a schematic illustration of the wiring layout employed in the novel battery charging unit.

Referring now to Fig. 6, which schematically illustrates the electrical apparatus enclosed within the housing 17 of the battery charging unit 15, and the connections leading therefrom, it will be observed that the unit is provided with a cable 24 enclosing conductors 25 and 26 which are connected at one end to the terminals of a conventional plug 27 adapted to be inserted in the outlet of a domestic supply of alternating current. The wires 25 and 26 have their other ends connected to two terminals of the primary winding 28 of a transformer, generally designated T. The secondary 29 of this transformer has a center tap to which is connected a wire 30 forming the negative side of the circuit for the charging unit. The two ends of the secondary 29 are connected by wires 31 and 32 to the input terminals 33 and 34 of a full wave rectifier 35. The rectifier 35 may be of conventional construction but preferably comprises two selenium cells interconnected for full wave rectification. The common output 36 of the rectifier 35 provides the positive side of the charging apparatus.

Wire 30, constituting the negative of the charger circuit, extends to a connecting lug 37 on a socket 38 for one of the indicating lamps 23. Wires 39 and 40 connect this lug 37 to corresponding lugs upon similar lamp sockets 41, 42 and 43. Other connecting wires 39a, 45, 45a, 46 and 46a connect the negative terminal lugs of sockets 41, 42 and 43 to corresponding terminal lugs upon lamp sockets 44, 47, 48, 49 and 50, respectively. It will thus be seen that each of the sockets for the lamps 23 has one terminal thereof connected to the negative side of the rectifier circuit.

The lamp socket 38 is provided with a second terminal lug 51, from which a conductor 52 extends to a negative battery terminal engaging member 53 hereinafter described in detail. Each of the other lamp sockets is likewise provided with a lug similar to 51 for connection thereto of individual conductors 54, 55, 56, 57, 58, 59, 60 and 61, the outer end of each of these conductors being provided with a negative battery terminal engaging member 53. The circuit further comprises a conductor or lead wire 62 extending from the common positive terminal 36 of rectifier 35 to a suitable connecting lug or post 63 from which parallel branch conductors 64, 65 and 66 extend to positive battery terminal engaging members 67, hereinafter described in detail. A conductor or wire 68 connects wire 62 to a convenient terminal lug 69 from which parallel lead wires 70, 71 and 72 each extend to other positive battery terminal engaging members 67. An additional wire 73 also connects the positive terminal 36 of rectifier 35 to a terminal or lug 74 from which extend individual conductors 75, 76 and 77 for additional positive battery engaging terminals 67.

In the form of the battery rectifier circuit here disclosed, nine identical parallel circuits are provided for supplying rectified current, each circuit constituting a pair of conductors, the outer ends of which are provided with battery terminal engaging members 53 and 67, respectively. The path of any one of the individual circuits is identical and it is, therefore, not deemed necessary to trace each one in detail. Suffice it to say that, for one of the circuits, the current flows from common positive rectifier terminal 36 through wires 62 and 64 to the positive battery engaging terminal member 67. The current then flows through the battery, to which the terminal engaging member 67 is attached, to the negative battery engaging terminal member 53, and then through a conductor 52 to one side of a lamp socket 38. The electrical current then continues through an indicating and ballast lamp 23 to the other terminal or lug 37 of the lamp socket and through the conductor 30 to the common negative center tap of the transformer, the path of the current being finally completed through the transformer to the terminals 33 and 34 of the rectifier 35.

While one convenient mode of connecting the parallel output circuits for the rectifier unit has been disclosed, it will be readily apparent that these connections may be modified without changing the basic electrical circuit. It should be noted, however, that each set of battery terminal engaging members 53 and 67 are in parallel with each of the other sets of terminal engaging members so that any one set thereof, combination of sets, or all, may be employed without altering the current flow to each battery being charged. The sets of conductors corresponding to one circuit of a rectifier may be united for a part of their distance in a common cable 78, if desired, the individual conductors, such as 52 and 64 being also individually rubber covered or otherwise insulated and the cable or covering 78 terminating a sufficient distance away from the battery engaging terminal members 53 and 67 so as to enable the latter to be freely connected to the terminals of a battery.

The primary 28 of the transformer T may comprise one or more windings which may be selectively employed to provide the desired output characteristic for the rectifier unit. As herein illustrated, the primary 28 includes two windings, the second winding, which is not in use, being represented by terminals 79.

Figures 3, 4:
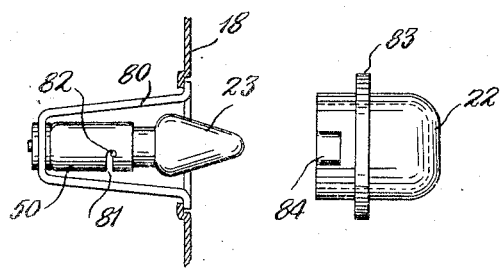
Fig. 3 is a sectional view taken substantially on the line 3—3 of Fig. 2.
Fig. 4 is a side elevational view of one of the removable caps for the lamps.

The mounting for each of the electric lamps 23, as shown in Fig. 3, comprises a substantially U-shaped bracket member 80 having flanged ends for attachment with a mounting plate, which may be a portion of the front face 18 of the charging unit or may be a separate plate attached thereto. The bight portion of the bracket 80 carries a lamp socket, such as 50, provided with a bayonet slot 81 for receiving the diametrically opposed pins 82 of the lamp 23.

The lamp is a standard low voltage type and, being wired in series with one of the conductors to which is attached a battery engaging member, such as 53, it will be lighted whenever a battery is attached for charging to the corresponding conductors, such as 59 and 77 (for the lamp in socket 50). This lamp, therefore, both indicates the charging condition of a battery and also serves as a ballast in the circuit. A suitable type lamp which may be employed is designed to operate at 2.9 volts and 0.17 ampere. Such a lamp is manufactured by the General Electric Company and designated No. 291. Obviously, the sockets 80 may be of the screw type, if desired, in which event the lamps 23 may be of the type known as G. E. No. 292, which are identical with the No. 291 type except that the former have threaded bases.

As previously mentioned, a translucent cap or cover member 22 is provided for each of the lamps 23 and is preferably formed of colored glass or plastic material. These caps are all alike and each is preferably provided with an integral ring-shaped flange 83 adjacent its inner end (see Fig. 4) and a pair of diametrically oppositely directed lugs 84 adjacent the said inner edge for cooperation with corresponding rectangular recesses 85 provided in the front face 18 of the battery charging unit 15. Hence, by inserting the lugs 84 through the openings 85 in the face 18 of the unit 15 and then rotating the cap a part of a revolution, the lugs will then be positioned behind a portion of the face 18 and the ring 83 will be in engagement with the outer surface of the face, thereby retaining the caps in proper position. The caps may be readily removed, by reversing this procedure, when it is necessary to replace a lamp 23.

The members 67 for engaging the positive terminals of a battery are formed as rings of lead or the like, which are attached to the positive wires, such as 75. The members 53 for engaging the negative terminals of a battery each comprises a substantially ring-shaped member 86 of lead or the like having an integral projecting side portion 87 for receiving the end of a negative wire, such as 61. This member 86 has its external surface completely covered by a cap 88 of rigid insulating material, such as polystyrene or the like, the lower face of the cap 88 having a bore aligned with the corresponding central opening of the conductive ring 86.

The diameter of the opening in the lower end of the cap 88, and the corresponding opening in the conductive ring 86, are less than the diameter of the positive terminal of a storage battery but are large enough to freely receive the negative terminal, it being standard practice in the manufacture of lead storage batteries to make the diameter of the positive terminals comparatively larger than that of the negative terminals. Consequently, the positive and negative terminal engaging members cannot be applied to a battery in reverse so that there is no possibility of the charge entering the battery in the wrong direction. Moreover, the negative terminal engaging member 86 having its external surface completely covered by the insulating cap 88, the battery charging leads or conductors, such as 61 and 75, may be allowed to dangle freely when not in use without danger of short circuiting the charging unit, since the members 53 and 67, even though in engagement, will be insulated from each other by the cap 88. If desired, the cap 88 may be given a distinctive color to provide an attractive appearance and facilitate its identification.

It will now be seen that by providing the improved battery charging unit and display stand in the manner illustrated in Fig. 1, storage batteries may be conveniently and attractively displayed and at the same time maintained at full charge, the charging condition of each battery being indicated by the illumination of the lamp 23 in the circuit. The illuminated lamps 23 are attention arresting as well as serving as a convenient means to indicate that a battery is charging and invite questions of the proprietor, giving him an opportunity to explain the advantages of his batteries resulting from keeping them fully charged. Since the battery unit is of the trickle charging type, it consumes very little electrical power and there is no danger of overcharging the batteries to a serious extent, the maximum output for each battery charging circuit not exceeding 100 milliamperes.

It will be apparent that the combined charging rack and display stand may be variously shaped and the constructional details thereof altered without departing from the scope of the invention. Thus, the stand may be formed of suitable side and top panels to provide a modern streamlined appearance. Furthermore, it is not necessary that the battery charging apparatus be enclosed in a separate housing which is attached to the display stand since a portion of the stand itself, for example, the top display panel thereof may constitute the housing for the charger. In such an installation the indicating and ballast lamps are mounted in an attractive and conspicuous position on the face of a portion of the stand per se.

While the battery charging unit has been disclosed as mounted upon a display stand for storage batteries for use in combination therewith, it will be apparent that the charging unit may be advantageously employed in installations other than in combination with a battery display stand or rack.

Although the preferred embodiment of the invention has been disclosed in considerable detail, it will be apparent that numerous modifications, adaptations, and changes may be made by one skilled in the art; therefore, the invention is not to be considered as limited to the exact constructions and arrangements herein disclosed but only by the spirit and scope of the appended claims.

Having thus described our invention, we claim:

1. An apparatus of the character described comprising a supporting and display stand having one or more shelves for a plurality of storage batteries of the type employed in automobiles, trucks or the like, a battery trickle charging apparatus mounted on said stand and including a plurality of electrical lamps mounted in a conspicuous position on said stand, a plurality of pairs of electrical conductors connected in parallel to the output of said charging apparatus, the number of pairs of said conductors corresponding to the number of said lamps with one of said lamps connected in series with one conductor of each pair of conductors, a battery terminal engaging member connected to the free end of each conductor, each of the members for engaging the negative terminal of a battery comprising a rigid insulating cap having a bore therein of a diameter less than the diameter of the positive terminal of a battery, and a conductive element positioned within the bore of each of said caps and connected respectively with the negative conductor of each pair of said conductors, whereby the connections to a battery cannot be reversed and the charging apparatus cannot be short-circuited by accidental engagement of the positive and negative terminal engaging members when the latter are not connected to a battery.

2. An apparatus of the character described comprising a supporting and display stand for a plurality of storage batteries of the type employed in automobiles, trucks or the like, a battery trickle charger mounted on said stand and including a plurality of electrical ballast lamps mounted in a conspicuous position on said stand, a plurality of pairs of electrical conductors connected in parallel to the output of said charger, the number of pairs of said conductors corresponding to the number of said lamps with one of said lamps connected in series with one conductor of each pair of conductors, a battery terminal engaging member connected to the free end of each conductor, each of the members for engaging the negative terminal of a battery comprising a rigid insulating cap having a bore therein of a diameter less than the diameter of the positive terminal of a battery, and a conductive element positioned within the bore of each of said caps and connected respectively with the negative conductor of each pair of said conductors, whereby the connections to a battery cannot be reversed and the charger cannot be short-circuited by accidental engagement of the positive and negative terminal engaging members when the latter are not connected to a battery.

3. An apparatus of the character described comprising a supporting and display stand for a plurality of storage batteries of the type employed in automobiles, trucks or the like, a battery trickle charging unit mounted on said stand in a conspicuous position, said unit including a transformer having a center tapped secondary coil and a rectifier enclosed in a unitary housing, connections from the ends of said secondary coil to the input of said rectifier, a plurality of electrical lamps mounted in a visible face of said housing, parallel connections from the center tap of said secondary coil to one terminal of each of said lamps, separate electrical conductors each having one end attached to the other terminal of said lamps respectively, storage battery terminal engaging members connected at the other ends of said electrical conductors, a plurality of other electrical conductors connected in parallel to the output of said rectifier, storage battery terminal engaging members connected to the other ends of said other electrical conductors, each of the members for engaging the negative terminal of a battery comprising a rigid insulating cap having a bore therein of a diameter less than the diameter of the positive terminal of a battery, and a conductive element positioned within the bore of each of said caps and connected respectively with the negative conductor of each pair of said conductors, whereby the connections to a battery cannot be reversed and the charging unit cannot be short-circuited by accidental engagement of the positive and negative terminal engaging members when the latter are not connected to a battery.

4. A trickle charging unit for storage batteries of the type employed in automobiles, trucks or the like, the said unit comprising a transformer and rectifier mounted in a unitary housing, a pair of wires adapted to connect the input of said unit to a source of alternating current, a plurality of electrical lamps mounted in a visible face of said housing, a plurality of pairs of electrical conductors connected in parallel to the output of said unit, the number of pairs of said conductors corresponding to the number of said lamps with each of said lamps connected in series with one conductor of each pair of conductors respectively, battery terminal engaging members connected to the free ends of said conductors, each of the members for connection with the negative terminal of a battery comprising a rigid insulating cap having a bore therein of a diameter less than the diameter of the positive terminal of a battery, and a conductive element positioned within the bore of each of said caps and connected respectively with the negative conductor of each pair of said conductors, whereby the connections to a battery cannot be reversed and the unit cannot be short-circuited by accidental engagement of the positive and negative terminal engaging members when the latter are not connected to a battery.

5. A trickle charging unit as defined in claim 4 and in which the said electrical lamps are ballast lamps to regulate the current flow to the batteries as well as to indicate charging of the batteries.

6. A trickle charging unit for storage batteries of the type employed in automobiles, trucks or the like, the said unit comprising a transformer and a rectifier electrically connected and enclosed in a unitary housing, a pair of wires adapted to connect the input of said unit to a source of alternating current, a plurality of electrical ballast lamps mounted in a visible face of said housing, a plurality of pairs of electrical conductors having their inner ends connected to the output of said unit, the number of said pairs of conductors corresponding to the number of said lamps with a separate lamp connected in series with one conductor of each of said pairs of conductors, battery terminal engaging members connected to the other ends of said conductors, the said members for engaging the negative terminals of batteries each including a ring of conductive material, and a cap of rigid insulating material surrounding the exterior of each of said rings, one face of each cap member having a bore aligned with the opening in the ring therein and having a diameter less than the diameter of the positive terminals of the batteries whereby the connections to the batteries cannot be reversed and the charging unit cannot be short-circuited by accidental engagement of the positive and negative terminal engaging members when the latter are not connected to a battery.

FRANK M. ROBINSON.
CARSTEN D. STEIN.

REFERENCES CITED

The following references are of record in the file of this patent:

UNITED STATES PATENTS

| Number | Name | Date |
|---|---|---|
| 1,320,747 | Elderkin, Jr. | Nov. 4, 1919 |
| 1,425,689 | Powell | Aug. 15, 1922 |
| 1,808,648 | Fisher | June 2, 1931 |
| 1,826,955 | Ruben | Oct. 13, 1931 |
| 1,950,428 | Young | Mar. 13, 1934 |
| 2,005,623 | Heyer | June 18, 1935 |
| 2,046,952 | Kaufmann | July 7, 1936 |
| 2,160,422 | Shipman | May 30, 1939 |
| 2,173,736 | Thomas | Sept. 19, 1939 |
| 2,322,388 | Powledge | June 22, 1943 |
| 2,375,866 | Nelms et al. | May 15, 1945 |
| 2,410,527 | Schinske | Nov. 5, 1946 |
| 2,431,707 | Pugh | Dec. 2, 1947 |